United States Patent
Cord et al.

(10) Patent No.: US 9,058,643 B2
(45) Date of Patent: Jun. 16, 2015

(54) PROCESS AND DEVICE FOR DETECTION OF DROPS IN A DIGITAL IMAGE AND COMPUTER PROGRAM FOR EXECUTING THIS METHOD

(75) Inventors: Aurelien Cord, Paris (FR); Didier Aubert, Mennecy (FR)

(73) Assignee: INSTITUT FRANCAIS DES SCIENCES ET TECHNOLOGIES DES TRANSPORTS DE L'AMENAGEMENT ET DES RESEAUX, Champs sur Marne (FR)

( * ) Notice: Subject to any disclaimer, the term of this patent is extended or adjusted under 35 U.S.C. 154(b) by 181 days.

(21) Appl. No.: 13/578,147

(22) PCT Filed: Feb. 8, 2011

(86) PCT No.: PCT/FR2011/050256
§ 371 (c)(1),
(2), (4) Date: Oct. 29, 2012

(87) PCT Pub. No.: WO2011/098716
PCT Pub. Date: Aug. 18, 2011

(65) Prior Publication Data
US 2013/0044910 A1    Feb. 21, 2013

(30) Foreign Application Priority Data
Feb. 9, 2010   (FR) ..................... 10 50902

(51) Int. Cl.
*G06T 7/00* (2006.01)
*B60S 1/08* (2006.01)

(52) U.S. Cl.
CPC ............ *G06T 7/0002* (2013.01); *B60S 1/0844* (2013.01); *G06T 7/0083* (2013.01); *G06T 2207/30248* (2013.01)

(58) Field of Classification Search
CPC ... G06K 9/4609; G06T 7/0022; G06T 7/0083
USPC ......................... 382/100, 163–165, 170–173
See application file for complete search history.

(56) References Cited

U.S. PATENT DOCUMENTS 5,923,027 A * 7/1999 Stam et al. ................. 250/208.1
6,313,454 B1 * 11/2001 Bos et al. .................... 250/208.1
(Continued)

FOREIGN PATENT DOCUMENTS

JP    2011-141838    5/2001

OTHER PUBLICATIONS

Kurihata et al.: "Rainy Weather Recognition from In-Vehicle Camera Images for Driver Assistance"; Intelligent Vehicles Symposium, IEEE, pp. 205-210, 2005.
(Continued)

*Primary Examiner* — Amir Alavi
*Assistant Examiner* — Kenny Cese
(74) *Attorney, Agent, or Firm* — Hamre, Schumann, Mueller & Larson, P.C.

(57) ABSTRACT

Devices and methods for detecting of drops on a transparent wall through which digital image is acquired by means of an image acquisition system. The method includes establishing a gradient image from the digital image by assigning to each pixel the value of the gradient for the pixel; filtering the gradient image by assigning to each pixel a value obtained by rank filtering; and establishing a mask representing the position of the detected drops in the digital image by activating the pixels for which the difference between the value of the pixel in the filtered image and the value of the pixel in the gradient image exceeds a predetermined value.

15 Claims, 6 Drawing Sheets

(56) References Cited

U.S. PATENT DOCUMENTS

2002/0121972 A1* 9/2002 Schofield et al. ............. 340/438
2007/0115357 A1* 5/2007 Stein et al. ................... 348/148
2007/0194208 A1* 8/2007 Stam et al. ................ 250/208.1
2008/0187219 A1* 8/2008 Chen et al. ................... 382/173

OTHER PUBLICATIONS

Smith et al.; "Median filter algorithm for estimating the threshold of detection on custom protein arrays", Biotechniques, vol. 41, No. 1, Nov. 2006, pp. 74-77.

* cited by examiner

PROCESS AND DEVICE FOR DETECTION OF DROPS IN A DIGITAL IMAGE AND COMPUTER PROGRAM FOR EXECUTING THIS METHOD

The present invention relates to a method, a computer program and a device for the detection of drops in a digital image or from a plurality of digital images.

The need to detect drops in digital images comes up in different applications. This need can first be in industrial processes, where it is necessary or important to determine whether there is condensation and formation of drops during the process. Another important application is driving a vehicle. When a vehicle is travelling, when it is raining, its windscreen gets covered in drops. It is understood that when rain starts to fall it can be interesting to take this change into account by detecting the presence of drops, whether to automatically activate a windscreen wiper, or to transmit information to the control system of the vehicle and adapt the performance of the latter to the rain situation which has been detected.

More generally, the detection of drops in an image can be important in any method which implements digital images, likely to be troubled or perturbed by the presence of drops in the image. For example, video surveillance systems can be improved by means of methods for image processing integrating a step of detection of drops in the image, followed by a step of correction of the image.

As is known, rain detectors, whereof the sole function is to detect drops (or rain), and constituted mainly by an infrared transmitter coupled to a detector, are used on board vehicles as drop detection devices. This assembly is arranged attached to the windscreen. The transmitter sends infrared radiation in the direction of the windscreen, and the detector receives the signal sent back by the latter. If there is a drop of water on the outer face of the windscreen, the latter reflects some of the infrared radiation and this reflection can be detected.

Although these are generally reliable, they do have some disadvantages. First, the detection of drops is made possible only on a small section of the windscreen. Next, these sensors do not provide quantitative information on the number of drops deposited on the windscreen. Finally, these sensors are usually placed in the vehicle interior at the level of the central rear-view mirror, and occupy a space taken by numerous applications embedded on board the vehicle.

Also, a method for detecting drops in an image is presented by the publication 'Rainy Weather Recognition from In-vehicle Camera Images for Driver Assistance', by M M. Kurihata et al., Intelligent Vehicles Symposium, IEEE, pp. 205-210, 2005.

This publication presents a method for detecting drops in a digital image. This method comprises a previous static learning phase in which analysis of principal components enables learning of characteristics of drops, from a large database. The method as such is then implemented during a matching phase, during which image parts are matched or at least are compared to reference images to identify drops.

This system provides good results essentially only against a relatively united background, for example an image of the sky. However, it lacks robustness at a complex level, for example an image representing an urban environment.

A first aim of the invention is therefore to propose a robust method for the detection of drops appearing in a digital image acquired through a transparent wall by means of an image acquisition system; a method allowing not only detection of the presence of drops, but also the position of the latter.

This aim is attained due to the method for detecting drops comprising the following steps:
b) a gradient image is established from said digital image, by assigning to each pixel the value of the gradient at the position of the pixel;
c) said gradient image is filtered to obtain a filtered image, by assigning to each pixel a value obtained by applying a rank filter to a neighbourhood of the pixel;
d) a mask representing the position of the detected drops in said digital image is determined, in which mask the pixels for which the difference between the value of the pixel in the filtered image and the value of the pixel in the gradient image exceeds a predetermined value are activated.

'Mask' is understood as a binary image, whereof the pixels are equal to either 0 (deactivated pixel), or 1 (activated pixel). The image acquisition system can be especially a photo camera or a digital video camera.

The method comprises two steps b) and c) for preparation of intermediate images, the gradient image and the filtered image, from which the information relative to the presence of drops is extracted, during step d) for creation of the mask.

For each pixel of the filtered image, the step of rank filtering consists in determining for a predetermined neighbourhood of the pixel (for example, a box of 15×15 pixels or 21×21 pixels centered on the considered pixel), the value below which there is a predetermined fraction (percentage) of the pixels, and correlatively above which there is a complementary predetermined fraction of the pixels. For example, the aim is to determine the value below which 95% of the pixels of the considered neighbourhood are found. This value is assigned to the considered pixel, in the filtered image.

The filtered image is an image in which the local 'noise' of the gradient image is reduced. A neighbourhood size substantially larger than the size of a drop is preferably selected, for example, triple or quadruple the size of a drop in both directions.

Also, subtracting the filtered image from the gradient image allows the variations in gradient due to the drops to be visible.

The result is considerable robustness for the method, allowing the latter to give good performance, including for images representing complex scenes, for example an urban environment.

A second aim of the invention is to propose a robust method for detection of drops from a plurality of digital images, allowing the detection of drops appearing in a plurality of digital images acquired through a transparent wall by means of an image acquisition system.

This aim is attained due to the method comprising the following steps:
a plurality of masks is obtained successively from said digital images by the method defined previously;
during a step h), a confirmed mask containing the drops appearing in at least one predetermined proportion of the resulting masks is set up. One understands that, in this method, the plurality of digital images from which the method is implemented can be exploited in different ways, specifically:
by calculating a mask for each of the digital images; or
by forming in the plurality of images groups of digital images, wherein a mask is obtained for each of these groups, the confirmed mask being then obtained on the basis of these masks.

A third aim of the invention is to propose a computer program, which can be executed on a computer or a calculator so as to detect drops in a digital image or a plurality of digital images provided to the program as start (input) data.

This aim is attained due to the computer program comprising instructions for executing one of the methods for detection of drops as defined previously.

A fourth aim of the invention is to propose a device for detection of drops for detecting the presence of drops in the image robustly, and able to be carried out by means of a standard image acquisition system.

This aim is attained due to the device comprising an image acquisition system and a calculator connected to the latter for receiving the images acquired by the image acquisition system, the calculator being suitable for executing the method defined previously. In particular, the invention concerns devices of this type used as devices for detection of drops of rain on a windscreen. Calculator here means either a computer, or a dedicated electronic component, especially a component whereof the physical architecture (hardware) executes some functions which can also be performed by software.

So, the invention especially concerns a device comprising an image acquisition system, and such a calculator connected to the latter for receiving the images acquired by the image acquisition system;

said calculator comprising:
  means for establishing a gradient image from said digital image, suitable for assigning to each pixel the value of the gradient at the position of the pixel to constitute the gradient image;
  filtering means suitable for constituting a filtered image by assigning to each pixel a value obtained by applying a rank filter to a neighbourhood of the pixel in the gradient image;
  means for establishing a mask representing the position of the detected drops in said digital image, in which mask the pixels for which the difference between the value of the pixel in the filtered image and the value of the pixel in the gradient image exceeds a predetermined value are activated.

The calculator can mainly comprise a central unit, but can also be arranged with several distributed calculation units.

In an embodiment, the calculator further comprises means for completing the mask by activating therein non-activated pixels located between neighbouring activated pixels.

In an embodiment, the calculator further comprises means for refining the mask by deactivating therein groups of activated connected pixels fulfilling at least one predetermined criterion of elimination relating to a property of the group of connected pixels.

In an embodiment, the calculator further comprises means for identifying drops in the mask obtained, each drop corresponding to a group of activated connected pixels.

The invention especially concerns a device such as described previously, arranged to successively produce a plurality of masks from digital images, and wherein the calculator further comprises mask confirmation means, suitable for selecting in a mask (called 'confirmed' mask) the drops appearing at least in a predetermined proportion of the previously obtained masks.

In an embodiment, the device further comprises transmission means for transmitting a control signal to a machine, said signal being a function of the number or density of drops identified on the digital image or the digital images. Density of drops here designates the ratio between the number of identified drops and the surface of the glass pane on which the drops have been detected (the density can be expressed as a number of drops/$m^2$), or the ratio between the identified drops and the surface expressed in pixels of one or more regions of interest in the image (the density can be expressed as a number of drops/pixel or number of drops/MPixels).

This type of device can be made especially to transmit a control (or activation) signal to a window wiper system.

The invention will be more clearly understood and its advantages will emerge more clearly from the following detailed description of embodiments represented by way of non-limiting examples. The description refers to the attached diagrams, in which.

Figure 1:
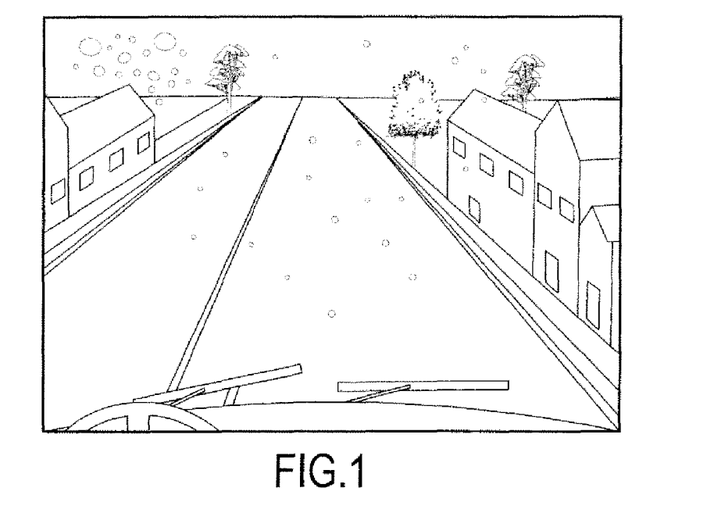
FIGS. 1 and 2 illustrate respectively an initial image from which the method according to the invention is executed, and a final image obtained by showing the detected drops in black.
Figure 2:
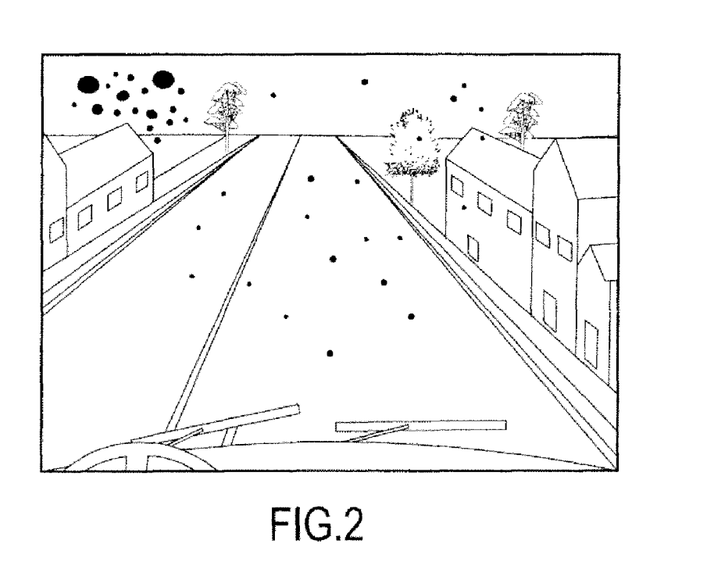
Figure 3:
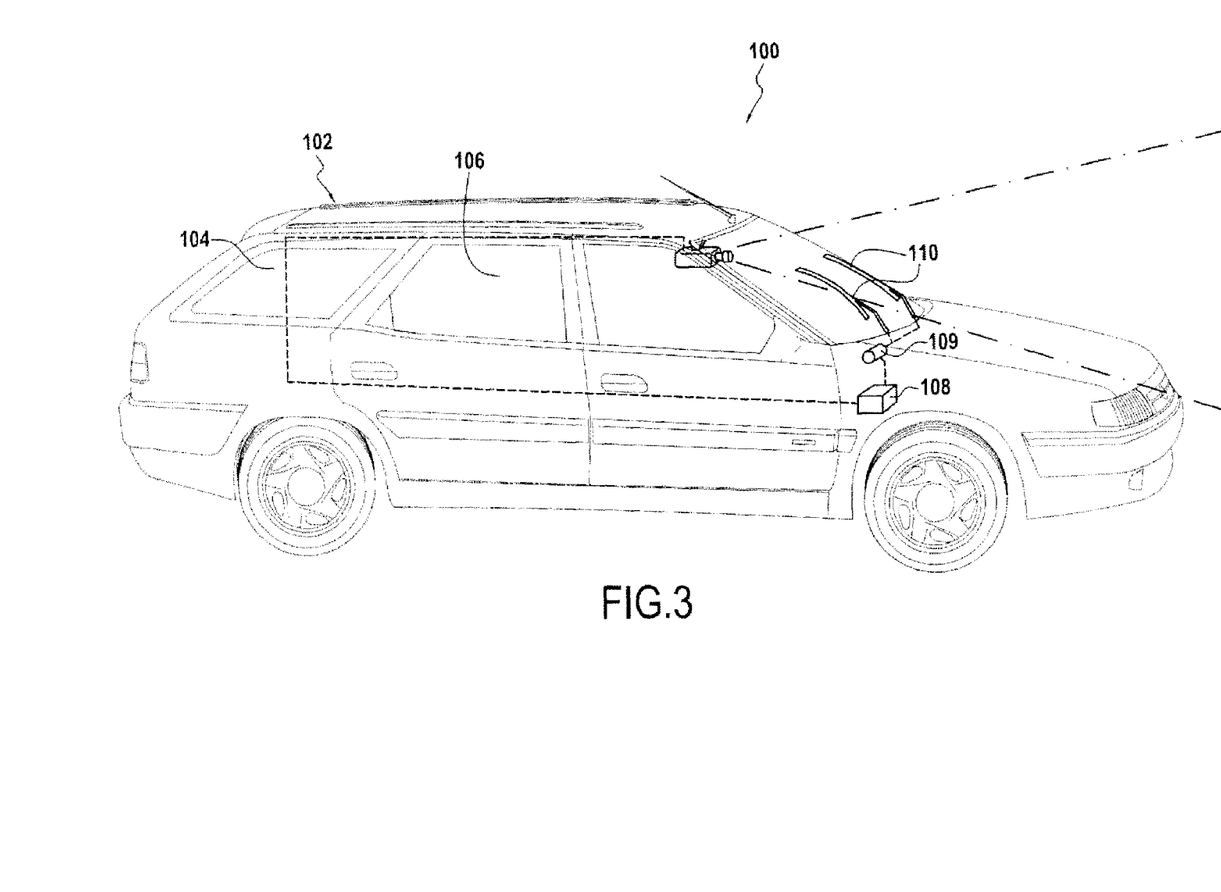
FIG. 3 is a perspective view of a device according to the invention arranged in a vehicle.

FIGS. 1 to 3 presents an important application of the invention, specifically the detection of drops on the windscreen of a vehicle.

FIGS. 1 and 2 illustrate digital images obtained by means of a device for detection of drops 100 represented in FIG. 3.

FIG. 1 illustrates a raw image, such as provided by the camera. FIG. 2 illustrates an image formed on completion of the method, by superposing on the raw image the mask obtained by means of the method. The pixels of the detected drops appear in black. Advantageously this second image enables instant evaluation of the number and density of drops present on the windscreen.

FIG. 3 presents schematically the device 100 for detection of drops according to the invention used to produce this result. Installed in a vehicle 102, this device 100 comprises a camera 104, placed in the vehicle interior 106, and a calculator 108 or onboard computer to which the camera 104 is connected. The camera 104 is infinite-focussed to provide a clear image of the landscape. Because of infinite focussing, obtaining clear images of the environment of the vehicle contributes to the efficacy of image processing performed by the calculator 108 (processing defined hereinbelow). On the contrary, a camera which would be focussed on the windscreen and not providing clear images of the environment would not produce the desired efficiency for the detection of drops.

Also, infinite focussing of the camera produces clear images of the environment of the vehicle: these images can be exploited for other useful processing, such as detection of the road signs, etc.

A program according to the invention, which executes the method for detecting drops from images acquired successively by the camera, is executed on the calculator 108.

The calculator 108, as a function of the information obtained as to the presence of drops on the windscreen, activates an electric motor 109 which actuates windscreen wipers 110 when necessary.

Figure 4:
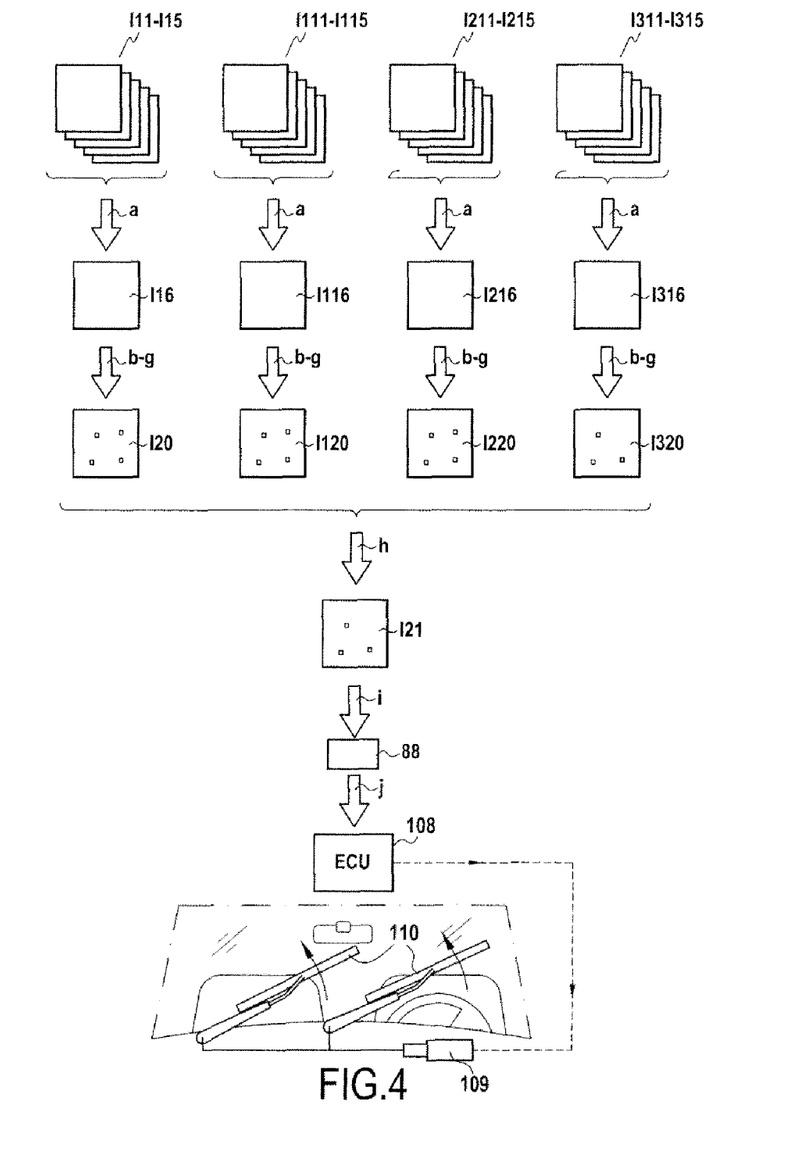
FIG. 4 is a schematic ensemble view of a method for detecting drops according to the invention.

In reference to FIGS. 4 to 9, an embodiment of the method for detecting drops according to the invention will now be described. FIG. 4 illustrates a schematic ensemble view of the method, whereas FIGS. 5 to 9 respectively illustrate steps a) to e) of the latter.

The method is executed from a sequence of digital images produced by a standard digital video camera such as CCD or CMOS matrix video camera.

This sequence of images is organised into groups of images. These groups of images can be configured in different ways: either without overlapping between the groups, as in the example which will be detailed hereinbelow, or with overlapping between the groups, signifying that images can be common to two groups or even more. For example, if images I1, I2, I3, I4, etc. are acquired continuously by a camera, the groups of images can be constituted as follows: The first group can contain the images I1 to I5, the second group the images I2 to I6, the third group the images I3 to I7, etc.

In the embodiment illustrated by FIGS. 4 to 9, a sequence of 20 images I11 to I15, I111 to I115, I211 to I215, I311 to I315 is shown.

Initially, the images are grouped by groups of five images (this could be any whole number in place of five): This constitutes therefore four groups of images I11 to I15, I111 to I115, I211 to I215, I311 to I315.

For each of these groups, the first step a) of the method consists in determining a mean image from the digital images of the group. So, from images I11 to I15 the mean image I16 is formed; from images I111 to I115 the mean image I116 is formed, etc. In each mean image, each pixel is assigned the mean value assigned to the pixel in the images of the considered group of images.

In the case where the images I11-I15, I111-I115, etc. are colour images the mean image is transformed into a grey image.

A suite of operations (steps b) to g) of the method) is then carried out which produces a mask (I20, I120, I220, I320) for each of the resulting mean images. These masks are binary images in which the pixels on which the presence of a drop has been detected are activated (that is, take the value 1).

FIGS. 5 to 9 illustrate the digital images obtained during steps a) to e) of the method. For better understanding, these steps of the method are illustrated by way of partial images comprising only 18 lines and 27 columns. Naturally, the complete images usually have larger dimensions, for example 480 lines and 640 columns.

Unless otherwise specified, the following explanation is given for processing made from images I11-I15.

As already mentioned, during the initial step a) of the method (FIG. 5) a plurality of digital images is averaged, in this case images I11-I15, so as to obtain a mean image I16 which forms the digital image on the basis of which the following steps of the method are carried out.

Figure 5:
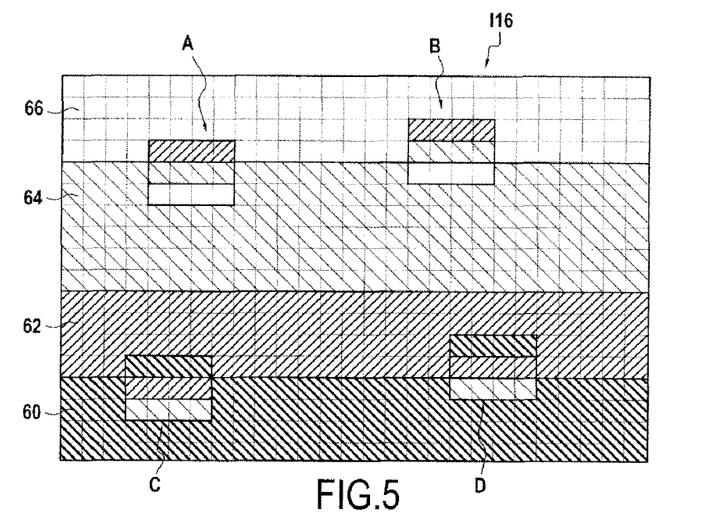
FIG. 5 is a representation of a partial digital mean image obtained from a set of digital images (step a) of the method)

FIG. 5 illustrates the mean image I16, obtained by calculating pixel by pixel the mean of images I1 to I15. The determination of the value of a pixel in the mean image can be done with different known formulas for calculating a mean value of a pixel among several images.

The digital image illustrated by FIG. 5 illustrates a landscape with a first dark area 60 (the road) at the bottom, followed immediately above by a second area 62 in medium grey; followed by a third area 64 and finally by a fourth area 66 (the sky, light).

This image is altered by the presence of four drops A, B, C, D. Each of these drops occupies an area of dimensions of 3×4 pixels. The drops represent in a reversed direction the hues of the scene they reflect: That is, they comprise dark pixels towards the top, and light pixels towards the bottom, inversely to the landscape reflected (areas 60, 62, 64, 66).

The following step b) of the method (FIG. 6) consists in establishing a gradient image I17 from the mean image I16.

Figure 6:
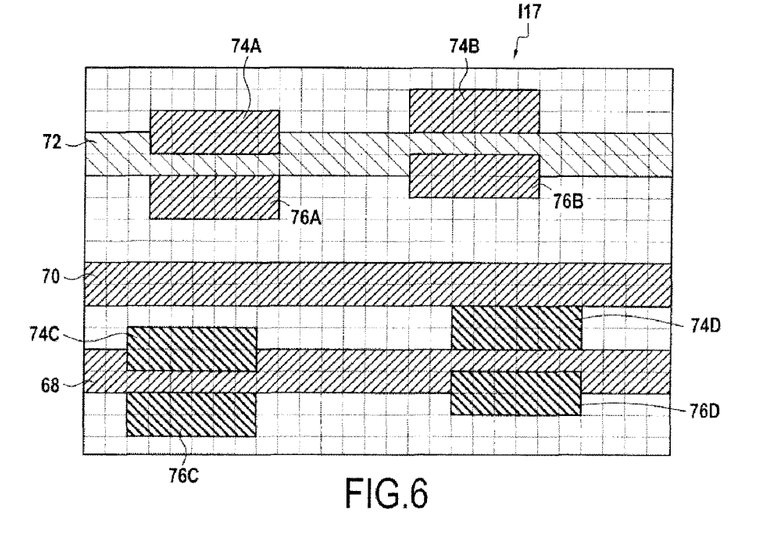
FIG. 6 is a representation of a digital gradient image obtained from the image of FIG. 5 (step b) of the method)

To establish the image I17, first a first gradient image 'en X' is formed in which each pixel takes the value determined by means of the following formula:

$$G_x(x,y)=|I_{16}(x,y)-I_{16}(x-1,y)|$$

in which | ... | represents the absolute value function, and $I_{16}(x,y)$ is the value taken by the pixel of the line x and the column y in the image I16. A first gradient image 'in Y' is calculated similarly, as:

$$G_y(x,y)=|I_{16}(x,y)-I_{16}(x,y-1)|.$$

The gradient image I17 is obtained by assigning to each pixel the value:

$$G(x,y)=\sqrt{(G_x(x,y)^2+G_y(x,y)^2)}$$

in which √ represents the function 'square root'. Other similar functions of gradient can be used within the scope of the invention.

Naturally, it is the variations in hue which appear in the gradient image I17. Three horizontal bands 68,70,72 can thus be identified, having a width of two pixels. These correspond to the respective variations in hue between the areas 60, 62, 64 and 66.

Also, for each drop two areas 74A, 76A, 74B, 76B, 74C, 76C, 74D, 76D can be identified, which correspond respectively to the upper and lower parts of the drops A, B, C, D. Since the image is more contrasted in its lower part, one can note that the gradient values of drops C and D are higher than those of drops A and B; the result is that the areas 74C, 74D and 76C, 76D of the drops C and D are darker than the corresponding areas of the drops A and B.

The following step c) of the method (FIG. 7) consists in filtering the gradient image I17 to obtain a filtered image I18, by assigning to each pixel a value obtained by rank filtering. As is known, rank filtering consists in assigning to each pixel the value below (or above) which there is a given percentage of values of the pixels located in a neighbourhood of the considered pixel. The presented method has been validated especially by assigning to each pixel of the filtered image the value below which there is 95% of pixels in a neighbourhood constituted by a box of 15×15 or 21×21 pixels.

Figure 7:
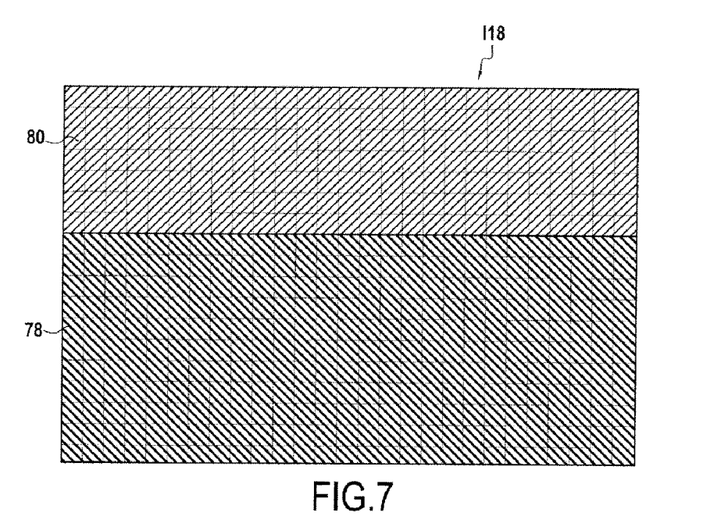
FIG. 7 is a representation of a digital filtered image obtained from the image of FIG. 6 by rank filtering (step c) of the method)

In the filtered image I18, a lower dark area 78 and an upper lighter area 80 can be identified. The lower area 78 results essentially from the presence of the dark areas 68, 70, 74C 76C, 74D and 76D in the gradient image I17.

The following step d) of the method (FIG. 8) consists in establishing a mask I19 representing the position of the detected drops. This is done in two steps. Initially, an image is formed by subtraction between the gradient image I17 and the filtered image I18.

Figure 8:
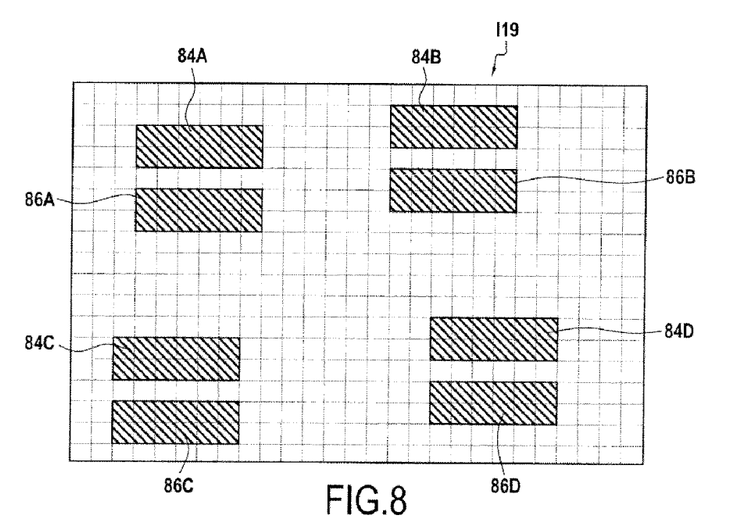
FIG. 8 is a representation of a mask obtained by subtraction and thresholding from the images of FIGS. 6 and 7 (step d) of the method)

Next, the mask I19 is established by a thresholding operation, by activating therein only those pixels for which the difference between the value of the pixel in the filtered image and the value of the pixel in the gradient image exceeds a predetermined value. The mask I19 can be considered as a 'high-gradient image'.

In this mask I19, areas 84A, 86A, 84B, 86B, 84C, 86C, 84D, 86D, can be identified, corresponding respectively to the upper and lower groups of activated connected pixels, for the drops A, B, C and D.

The interest of the method is that the different gradient areas (74A, 76A, 74B, 76B, 74C, 76C, 74D, 76D) are effectively detected and activated in the mask I19. This is permitted by the subtraction operation of the filtered image from the gradient image at step d), which leads to remove a local component from the value of the gradient. If only gradient type functions had been used for detecting the position of the drops in the image, this result could not have been obtained.

Indeed, undertaking the thresholding operation of the gradient image I17 with a threshold having the value of area 78 (corresponding to areas 74C, 76C, 74D and 76D) does not enable detection of drops A and B: With such a threshold value, areas 84A, 86A, 84B and 86B do not appear in the thresholded image. Inversely, undertaking the thresholding operation of the gradient image I17 with a threshold having the value of area 80 (corresponding to areas 74A, 76A, 74B and 76B), would have retained, in addition to drops A, B, C and D, areas 70 and 68, without making it possible to distinguish the latter from drops C and D.

Consequently, using the filtered image I18 during steps c) and d) advantageously makes it possible to identify in the gradient image I17 the four drops A, B, C and D, and only them.

The following step e) of the method (FIG. 9) consists in completing the mask by activating therein non-activated pixels located between neighbouring activated pixels.

Figure 9:
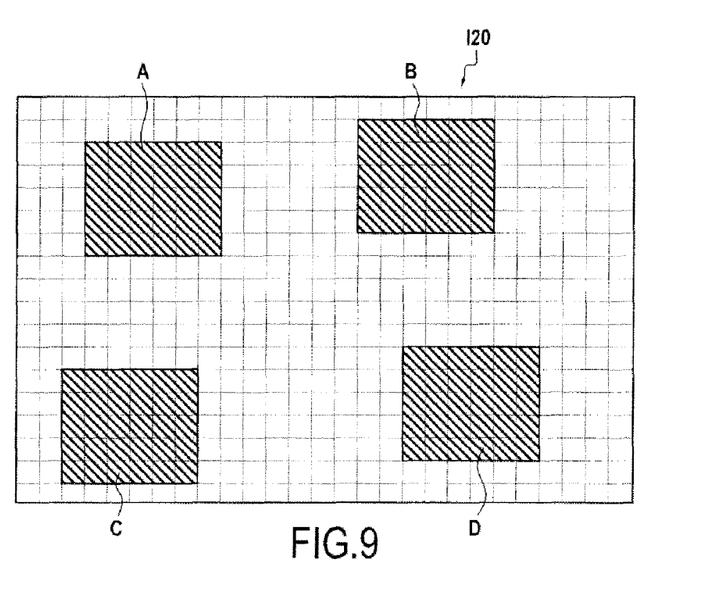
FIG. 9 is a representation of a confirmed mask obtained from the mask of FIG. 5 (step h) of the method).

The aim of this step is to fulfil the 'holes' in the mask so as to allow areas of neighbouring activated pixels, corresponding in fact to different parts of the same drop present in the image, to be identified as one and the same drop.

In the expression, "located between neighbouring activated pixels", the term "between" must be considered as having a broad meaning. In fact, step e) consists in activating pixels when they are surrounded or encircled (at least partially) by activated pixels. This step more precisely consists in activating each of the pixels which fulfil an activation criterion, this activation criterion being a function of the number, distance and/or position of the activated pixels located near the considered pixel.

The neighbourhood of the considered pixel can be defined in different ways and as a function of the selected activation criterion.

In an embodiment, this neighbourhood contains all the pixels close to the considered pixel, that is, all the pixels remote by a distance of less than the size of a drop in the image (optionally, the maximal size of a drop), or a fraction of this distance. The activation criterion consists in activating all the pixels which at least have a predetermined number of activated pixels in this neighbourhood.

In other embodiments, the form and the size of the neighbourhood can be specified.

For example, it is possible to use as neighbourhood the four pixels above and below the considered pixel. As in the preceding embodiment, the activation criterion in this case consists in activating the pixels which have at least a predetermined number of activated pixels in their neighbourhood (defined that way). In the example illustrated by the figures, two activated pixels at a minimum must be in the neighbourhood of a considered pixel to allow activation of the latter. The image I20 illustrates this function applied to image I19.

An example of a mask completed in this way is given in FIG. 9 which shows four areas of activated connected pixels, corresponding to the four detected drops A, B, C, and D.

The following step f) of the method consists in refining the mask by deactivating therein groups of activated connected pixels fulfilling at least one predetermined elimination criterion, relating to a property of the group of connected pixels. The aim of this step is to eliminate from the mask any groups of activated connected pixels which would not correspond to drops present on the windscreen. This is based on the physical properties of liquids which cause the size of drops to vary within fixed minimal and maximal limits, as well as the elongation of drops or their eccentricity.

Different elimination criteria can therefore be used (optionally simultaneously). In the presented example, the following criteria are used simultaneously:
  a first elimination criterion is fulfilled if and only if the number of pixels of the group of activated connected pixels is less than a first predetermined value and/or greater than a second predetermined value (this is therefore a criterion relating to the surface of the drop);
  a second elimination criterion is fulfilled if and only if the ratio between the height and the width of the group of activated connected pixels is less than a third predetermined value and/or greater than a fourth predetermined value;
  a third elimination criterion is fulfilled if and only if the eccentricity of the group of activated connected pixels is less than a predetermined value. The eccentricity is defined in the embodiment illustrated as the ratio between the square of the perimeter and the surface, but other definitions can be used.

The following step g) of the method consists in identifying drops in the mask obtained, each drop corresponding to a group of activated connected pixels. The aim of this step is to discretise the information, and to supply the information on the drops present in the image in the form of a list of drops. Preferably, some information is extracted for each drop, such as for example the position of the drop in the image (line and column numbers). Naturally, the position of the drop can be defined in different ways, for example its barycentre, by a median point, etc. For each drop different geometric variables, such as surface, perimeter, etc. can also be calculated.

This information can optionally be exploited from this stage of the method.

However, before this information is exploited, it is preferable to refine it or purify it by eliminating some of the drops identified during the preceding steps, since it is clear that these are in fact artefacts and not drops.

For this, the method comprises a following step h) which consists in further refining the information obtained by producing a 'confirmed' mask I21. This step h) is based on the knowledge that a drop generally remains at a constant position on the surface where it is located; also, it must be detected at this position on all or at least on a majority of the images. This principle is naturally particularly efficient in the case of drops formed on a windscreen of a moving vehicle, since by contrast the values of the pixels featuring elements of the landscape change constantly.

On the basis of this principle, the confirmed mask I21 is determined by retaining in this mask only the drops appearing at least in a predetermined proportion of the previously obtained masks I20, I120, I220, I320. In this case, the criterion selected for retaining a drop in the confirmed mask I21 consists in requiring that the drop be detected in 100% of the masks obtained during the preceding steps.

Now, in the example presented, three of the drops have been systematically detected in the four masks I20-I320 obtained, but one of the drops (that located at the top right of the images, drop 'B' in FIGS. 5 to 9) has not been detected or retained in the mask I320. It follows that this drop 'B' is eliminated from the confirmed mask I21 (FIG. 4).

In practice, in the method as presented, this requirement is verified as follows:
  the position of the median points of all the detected drops is determined, in each of the masks studied (I20-I120-I220-I320);
  for any drop present in the first mask (I20) of the series of masks studied, it is verified that in each of the masks obtained in subsequent steps (I120-I220-I320), there is at least one drop whereof the median point is far from that of the drop studied by a predetermined distance. If this property is verified for each of the masks obtained in subsequent steps, the drop is conserved in the confirmed mask (I21); in the opposite case, it is considered as an artefact and is deleted, and the corresponding pixels of the mask I21 are deactivated.

Once the confirmed mask I21 is obtained, the information relative to the detected drops, produced during step g) of the method (position, surface, perimeter, etc., of the detected drops) is updated, where required.

Next, from the confirmed mask I21, the total number 88 of detected drops is evaluated, each drop therefore corresponding to a group of activated connected pixels. In the example presented, forty drops have been detected on the entire image of FIG. 1.

Finally, in a step i) of the method, a control signal is sent to a machine, said signal being a function of the number or density of drops identified in the preceding step (this number can have decreased relative to its initial value during the mask confirmation step).

It can be understood that according to the case the information transmitted can be either the number of drops itself, or the density of drops, obtained by dividing, over different regions of interest, the number of drops by the area of the region of interest, or a binary absence/presence indication of drops or rain. In this latter case, a criterion is selected to move the value of the indicator to 1; for example, it can be considered to be raining (presence of drops) when the number of drops is greater than a predetermined number.

In the application presented by the figures, the information of the number of drops is transmitted to the electronic control unit 108. The latter deduces whether it is necessary or not to activate the windscreen wipers 110 or optionally to adapt the speed and/or the sweeping frequency of the latter. In this case, on receipt of the information according to which forty drops are on the windscreen, the control unit 108 activates the windscreen wipers, and transmits an actuation command to an electric motor 109 which then activates the windscreen wipers 110. The control unit 108 connected to the electric motor 109 and to the windscreen wipers 110 constitutes a window wiper system.

The method presented by the embodiment is characterised by the use of a sequence of images, which makes it possible first to determine mean images I16-I116-I216-I316, then to obtain masks I20-I120-I220-I320, and finally to obtain a confirmed mask I21. Naturally, the method according to the invention can be carried out from a single image; it can also be carried out so as to calculate a mask for each of the starting images I11-I15, I111-I115, I211-I215, I311-I315; it can also be carried out by first averaging the set of images of the sequence I11-I15, I111-I115, I211-I215, I311-I315, but without confirmation of the mask during stage h) of the method in this case.

The invention claimed is:

1. A method for detection of drops appearing in a digital image acquired through a transparent wall by means of an image acquisition system, the method comprising the following steps:
    b) a gradient image is established from said digital image, by assigning to each pixel the value of the gradient at the position of the pixel;
    c) said gradient image is filtered to obtain a filtered image by assigning to each pixel a value obtained by applying a rank filter to a neighbourhood of the pixel; and
    d) a mask is established representing the position of the detected drops in said digital image, in which mask the pixels for which the difference between the value of the pixel in the filtered image and the value of the pixel in the gradient image exceeds a predetermined value are activated.

2. The method as claimed in claim 1, further comprising the following step:
    e) the mask is completed by activating therein non-activated pixels, located between neighbouring activated pixels.

3. The method as claimed in claim 1, further comprising the following step:
    f) the mask is refined by deactivating therein groups of activated connected pixels fulfilling at least one predetermined criterion of elimination, relating to a property of the group of connected pixels.

4. The method as claimed in claim 3, in which a criterion of elimination taken into account at step f) is fulfilled if and only if the number of pixels of the group of activated connected pixels is less than a first predetermined value and/or greater than a second predetermined value.

5. The method as claimed in claim 3, in which a criterion of elimination taken into account at step f) is fulfilled if and only if the ratio between the height and the width of the group of activated connected pixels is less than a third predetermined value and/or greater than a fourth predetermined value.

6. The method as claimed in claim 3, in which a criterion of elimination taken into account at step f) is fulfilled if and only if the eccentricity of the group of activated connected pixels is less than a predetermined value.

7. A method for detection of drops from a plurality of digital images, following which in an initial step a) said plurality of digital images is averaged so as to obtain a mean image which forms the digital image on the basis of which the method as claimed in claim 1 is carried out.

8. The method for detection of drops as claimed in claim 1, further comprising the following step:
    g) drops in the mask obtained are identified, each drop corresponding to a group of activated connected pixels.

9. A method for detection of drops appearing in a plurality of digital images acquired through a transparent wall by means of an image acquisition system, the method comprising the following steps:
    a plurality of masks is established successively from said digital images by the method defined in claim 8;
    during a step h) a confirmed mask is established containing the drops appearing in at least one predetermined proportion of masks obtained in this way.

10. The method for detection of drops as claimed in claim 8, comprising further the following step:
    i) a control signal is sent to a machine, said signal being function of the number or of the density of drops identified at step g), especially in the case where the machine is a window wiper system.

11. A non-transitory computer-readable medium on which is stored a computer program comprising computer-readable instructions for executing the method for detecting drops as claimed in claim 1.

12. A device for detection of drops, comprising an image acquisition system and a calculator connected to the latter for receiving images acquired through a transparent wall by the image acquisition system, the calculator being suitable for executing the method as claim in claim 1.

13. The method for detection of drops as claimed in claim 7, further comprising the following step:
    (g) drops in the mask obtained are identified, each drop corresponding to a group of activated connected pixels.

14. A non-transitory computer-readable medium on which is stored a computer program comprising computer-readable instructions for executing the method for detecting drops as claimed in claim 7.

15. A device for detection of drops, comprising an image acquisition system and a calculator connected to the latter for receiving images acquired through a transparent wall by the image acquisition system, the calculator being suitable for executing the method as claimed in claim 7.

* * * * *